US008687726B2

(12) United States Patent
De Rosny et al.

(10) Patent No.: US 8,687,726 B2
(45) Date of Patent: Apr. 1, 2014

(54) METHOD FOR TRANSMITTING DIGITAL DATA, AND TRANSMITTER BASE IMPLEMENTING SUCH A METHOD

(75) Inventors: Julien De Rosny, Nogent sur Marne (FR); Geoffroy Lerosey, Paris (FR); Arnaud Tourin, Sevres (FR); Mathias Fink, Meudon (FR)

(73) Assignees: Time Reversal Communications, Cergy Saint Christophe (FR); Centre National de la Recherche Scientifique-CNRS, Paris (FR)

(*) Notice: Subject to any disclaimer, the term of this patent is extended or adjusted under 35 U.S.C. 154(b) by 37 days.

(21) Appl. No.: 12/994,013

(22) PCT Filed: Nov. 9, 2009

(86) PCT No.: PCT/FR2009/052154
§ 371 (c)(1),
(2), (4) Date: Jul. 18, 2011

(87) PCT Pub. No.: WO2011/055024
PCT Pub. Date: May 12, 2011

(65) Prior Publication Data
US 2012/0207234 A1 Aug. 16, 2012

(51) Int. Cl.
*H04L 27/28* (2006.01)
(52) U.S. Cl.
USPC ............................ 375/267; 375/260; 375/299
(58) Field of Classification Search
USPC .......... 375/260, 267, 299, 347; 370/328, 335, 370/342; 455/101, 132
See application file for complete search history.

(56) References Cited

U.S. PATENT DOCUMENTS

| 7,636,297 | B1* | 12/2009 | Lee et al. | 370/208 |
|---|---|---|---|---|
| 2005/0078769 | A1 | 4/2005 | Lo | |
| 2005/0180312 | A1 | 8/2005 | Walton et al. | |
| 2007/0177681 | A1* | 8/2007 | Choi et al. | 375/260 |
| 2007/0258394 | A1* | 11/2007 | Hamaguchi | 370/310 |
| 2007/0291867 | A1* | 12/2007 | Khan et al. | 375/267 |
| 2008/0267138 | A1* | 10/2008 | Walton et al. | 370/336 |

OTHER PUBLICATIONS

Persefoni Kyritsi, George Papanicolaou, Patrick Eggers and Alex Oprea, "MISO time reversal and delay spread compression for FWA channels at 5GHz", Stanford University, Aalborg University, IEEE, 2004.*

(Continued)

*Primary Examiner* — Aristocratis Fotakis
(74) *Attorney, Agent, or Firm* — Frost Brown Todd LLC

(57) ABSTRACT

A method for transmitting digital data on a communication channel, between a transmitter base comprising N transmission antennas and K receivers. A signal carrier of frequency $f_0$ and M sub-carriers of index m are used, adapted to transport K streams of digital data $s_k$ in parallel between the transmitter base and each receiver. The method comprises a step in which N.M complex symbols $t_n(m)$ are calculated from K.M symbols $s_k(m)$, by $$t_n(m) = \sum_{k=1}^{K} \alpha_k \cdot H_{k,n}^*(m) \cdot s_k(m),$$

where * denotes a complex conjugate, $H_{k,n}(m)$ is a complex value estimating the transfer function of the communication channel between the transmission antenna n and the receiving antenna k at a corresponding frequency of the sub-carrier m, and $\alpha_k$ is a normalization coefficient.

13 Claims, 2 Drawing Sheets

(56) References Cited

OTHER PUBLICATIONS

Persefoni Kyritsi, Patrick Eggers and Alex Oprea, "MISO Time Reversal and Time Compression", Aalborg University, Waverider Communications, 2004.*

Gomes, J. et al., "Experimental assessment of time-reversed OFDM underwater communications," Accoustics '08, Paris (Jun. 29-Jul. 4, 2008) pp. 1-6.

Gomes, J. et al., "OFDM Demodulation in Underwater Time-Reversed Shortened Channels," Oceans (Sep. 15, 2008) pp. 1-6.

Gomes, J. et al, "Time-Reversed OFDM Communication in Underwater Channels," Fifth IEEE Workshop on Signal Processing Advances in Wireless Communications, Lisbon (Jul. 11-14, 2004) pp, 1-5.

International Search Report dated Aug. 2, 2010 for PCT/FR2009/052154.

Koike-Akino, T. et al, "Unified Analysis of Linear Block Precoding for Distributed Antenna Systems," IEEE Globalcom 2009 Telecommunications Conference Proceedings (Nov. 30, 2009) pp. 1-6.

* cited by examiner

METHOD FOR TRANSMITTING DIGITAL DATA, AND TRANSMITTER BASE IMPLEMENTING SUCH A METHOD

TECHNICAL FIELD

This invention relates to a method for transmitting digital data on a communication channel.

It more specifically relates to a method for transmitting digital data on a communication channel, between a transmitter base comprising transmission antennas of index n, where n is between 1 and N and N is an integer greater than or equal to 1, and at least one receiver of index k, where k is between 1 and K and K is an integer greater than or equal to 1, each comprising at least one receiving antenna, a method wherein a signal carrier of frequency $f_o$ is used to transport the digital data on the communication channel, and sub-carriers are used of index m, where m is between 1 and M and M is an integer greater than or equal to 1, adapted to transport K streams of digital data $s_k$ in parallel from the transmitter base, each stream of digital data $s_k$ being intended for each receiver of index k.

BACKGROUND

In the communication channel, the transmitted signals simultaneously follow a multitude of different paths and are subject to reflection. Each receiving antenna receives a signal which is a superposition of a multitude of signals corresponding to this multitude of paths between the transmitter base and each receiver, such that interference phenomena occur which, in certain positions of a receiver antenna, can interfere with or cancel out the signal received by the receiver.

Transmission methods are known which use multi-carrier modulation, such as OFDM (for Orthogonal Frequency Division Multiplexing) which consists of multiplexing digital data onto frequency sub-carriers in order to transport the data on a communication channel. These sub-carriers are frequency-spaced and are orthogonal to each other to reduce interference.

At the same throughput as a single carrier modulation method, the signals have longer temporal durations and echoes in the communication channel have a reduced effect, meaning that there is less intersymbol interference (ISI) between consecutive symbols.

Although such multi-carrier methods are very advantageous, they do not completely cancel the interference problem, and it is common, for example, to add a guard space period between each symbol sent, which inevitably leads to a slower bandwidth.

However, bandwidth demand is constantly increasing, which means there is a need to reduce the time interval for digital data on the communication channel.

SUMMARY

One purpose of the invention is to improve upon these methods and overcome the disadvantages described above.

To do so, the method of the invention comprises the following steps:
(a1) each of the K streams of digital data $s_k$ are transformed into M parallel streams $s_k(m)$ of symbols, each of the parallel streams being intended for a sub-carrier of index m,
(b1) N.M complex symbols $t_n(m)$ are calculated from the K.M symbols $s_k(m)$, by:

$$t_n(m) = \sum_{k=1}^{K} \alpha_k \cdot H_{k,n}^*(m) \cdot s_k(m)$$

where
 * indicates a complex conjugate,
(c1) N multi-carrier modulations of the complex symbols $t_n(m)$ are performed, where m is between 1 and M, to produce N transmission signals $v_n(t)$, each transmission signal $v_n(t)$ being intended for a transmission antenna n, and all the multi-carrier modulations being synchronous with each other, and
(d1) each transmission signal $v_n(t)$ in the communication channel is transmitted by the transmission antenna n of the transmitter base.

Because of these measures, particularly the processing in step (b1), the method of the invention offers at least the following advantages:
 firstly, the signals sent by the transmission antennas arrive and are in phase at each receiving antenna, in spite of the multitude of paths in the communication channel. This attenuates the echoes in the signal received at a receiving antenna, and the ISI is further reduced,
 secondly, the signals transmitted by the transmission antennas are spatially focused on the receiving antennas. Each receiver receives almost nothing but the signal intended for it, and the communications to the different receivers are somewhat isolated from each other, which improves the security of the transmission.

In addition, step (b1) is a way of approximating a convolution integral between a time signal $s_k(t)$ to be transmitted on the communication channel and a time reversal of the impulse response $h_{k,n}(t)$, where $H_{k,n}(m)$ are complex values estimating the amplitude and phase of the impulse response $h_{k,n}(t)$ at the frequencies of each sub-carrier of index m. The reader may refer to patent FR-2 748 137 for this communication technique. By using multiplexed sub-carriers, the time calculation of this prior art document is achieved at a lower computational cost because the information is in the frequency domain and substantially improves the OFDM multi-carrier technique because the ISI is further reduced. These two techniques are therefore advantageously combined.

In various embodiments of the method for transmitting digital data according to the invention, one or more of the following measures may additionally be used:
 the multi-carrier modulation of the complex symbols $t_n(m)$, where m is between 1 and M, is done by the following steps:
(a2) an inverse fast Fourier transform (IFFT) of the complex symbols $t_n(m)$ is calculated to produce transformed complex symbols $u_n(m)$, by:

$u_n(m) = \text{IFFT}(t_n(m))$, where m is between 1 and M, (b2) temporal serialization of these transformed complex symbols $u_n(m)$ into a serial stream of symbols is performed,
(c2) a synchronous modulation of this serial stream is performed with the signal carrier of frequency $f_0$ to produce modulated signals $u_{n,m}(t)$ for each transmission antenna n by:

$u_{n,m}(t) = \Re(u_n(m) \cdot e^{2i\pi f_0 t})$ where
 $\Re(\ )$ is the real part,
 is the complex number defined by $i=\sqrt{-1}$, and
 t is the time,
(d2) each modulated signal $u_{n,m}(t)$ is filtered and a transmission signal $v_n(t)$ is produced for each transmission antenna, by:

$$v_n(t) = \sum_{j=1}^{\infty} \sum_{m=1}^{M} u_{n,m}(t) \cdot h\left(t - (j-1) \cdot T_s - (m-1) \cdot \frac{T_s}{M}\right)$$

where
> h(t) is the impulse response of a transmission filter;
> the inverse fast Fourier transform (IFFT) of the complex symbols $t_n(m)$ to produce transformed complex symbols $u_n(m)$ is calculated by:

$$u_n(m) = \frac{1}{M} \cdot \sum_{p=1}^{M} t_n(p) \cdot e^{\left(+\frac{2i\pi}{M}\right)(m-1)\cdot(p-1)};$$

> the normalization coefficient $\alpha_k$ is a predetermined constant $\alpha$;
> the normalization coefficient $\alpha_k$ is a value calculated from the values of the symbols $s_k(m)$ and the values of the transfer functions of the communication channel $H_{k,n}(m)$;
> the normalization coefficient $\alpha_k$ is calculated by:

$$|\alpha|^2 = \frac{\Pi}{\langle |s(m)|^2 \rangle \sum_n \sum_k |H_{k,n}(m)|^2} = \alpha_k$$

where
> Π is a predetermined mean transmitted power,
> < > represents a mean for the symbols,
> $\langle |s(m)|^2 \rangle$ is the variance of the symbols;
> the normalization coefficient $\alpha_k$ is calculated by:

$$|\alpha_k|^2 = \frac{\Pi}{\langle |s(m)|^2 \rangle \left(\sum_n |H_{k,n}(m)|\right)^2 \sum_k \left(\sum_n |H_{k,n}(m)|^2\right)^{-1}}$$

where
> Π is a predetermined mean transmitted power,
> < > represents a mean for the symbols,
> $\langle |s(m)|^2 \rangle$ is the variance of the symbols;
> the normalization coefficient $\alpha_k$ is calculated $$|\alpha_k|^2 = \frac{\Pi}{\langle |s(m)|^2 \rangle \left(\sum_n |H_{k,n}(m)|\right)^2 \sum_{k'} \frac{\beta_{k'}^2}{\left(\sum_n |H_{k',n}(m)|^2\right)}} \beta_k^2$$

where
> Π is a predetermined mean transmitted power,
> $\beta_k$ is a predetermined mean power received by the receiving antenna k,
> < > represents a mean for the symbols,
> $\langle |s(m)|^2 \rangle$ is the variance of the symbols;
> each complex value $H_{k,n}(m)$ is a value estimating only the phase of the transfer of the communication channel between the transmission antenna n and the receiving antenna k at the corresponding frequency of the sub-carrier m;

the normalization coefficient $\alpha_k$ is calculated by:

$$|\alpha_k|^2 = |\alpha|^2 = \frac{\Pi}{\langle |s(m)|^2 \rangle NK}$$

where
> Π is a predetermined mean transmitted power,
> < > represents a mean for the symbols,
> $\langle |s(m)|^2 \rangle$ is the variance of the symbols;
> the normalization coefficient $\alpha_k$ is calculated by:

$$|\alpha_k|^2 = \frac{\Pi}{\langle |s|^2 \rangle \left(\sum_n |H_{k,n}(m)|\right)^2 N \sum_{k'} \left(\sum_n |H_{k',n}(m)|\right)^{-2}}$$

where
> Π is a predetermined mean transmitted power,
> < > represents a mean for the symbols,
> $\langle |s(m)|^2 \rangle$ is the variance of the symbols;
> the normalization coefficient $\alpha_k$ is calculated by:

$$|\alpha_k|^2 = \frac{\Pi \beta_k^2}{\langle |s|^2 \rangle \left(\sum_n |H_{k,n}(m)|\right)^2 N \sum_{k'} \frac{\beta_{k'}^2}{\left(\sum_n |H_{k',n}(m)|\right)^2}}$$

where
> Π is a predetermined mean transmitted power,
> $\beta_k$ is a predetermined mean power received by the receiving antenna k,
> < > represents a mean for the symbols,
> $\langle |s(m)|^2 \rangle$ is the variance of the symbols.

$$|\alpha_k|^2 = \frac{\Pi \beta_k^2}{\langle |s|^2 \rangle \left(\sum_n |H_{k,n}(m)|\right)^2 N \sum_{k'} \frac{\beta_{k'}^2}{\left(\sum_n |H_{k',n}(m)|\right)^2}}$$

where
> Π is a predetermined mean transmitted power,
> $\beta_k$ is a predetermined mean power received by the receiving antenna k,
> < > represents a mean for the symbols,
> $\langle |s(m)|^2 \rangle$ is the variance of the symbols.

The invention also relates to a transmitter base comprising:
> a calculation means that implements the above method and generates N transmission signals $v_n(t)$ of index n, where n is between 1 and N and N is an integer greater than or equal to 1, from K streams of digital data $s_k$ of index k, where k is between 1 and K and K is an integer greater than or equal to 1, and
> transmission antennas adapted to transmit each transmission signal $v_n(t)$ on a communication channel.

Other features and advantages of the invention will be apparent from the following description of one of its embodiments, provided as a non-limiting example with reference to the attached drawings.

DETAILED DESCRIPTION

Figure 1:
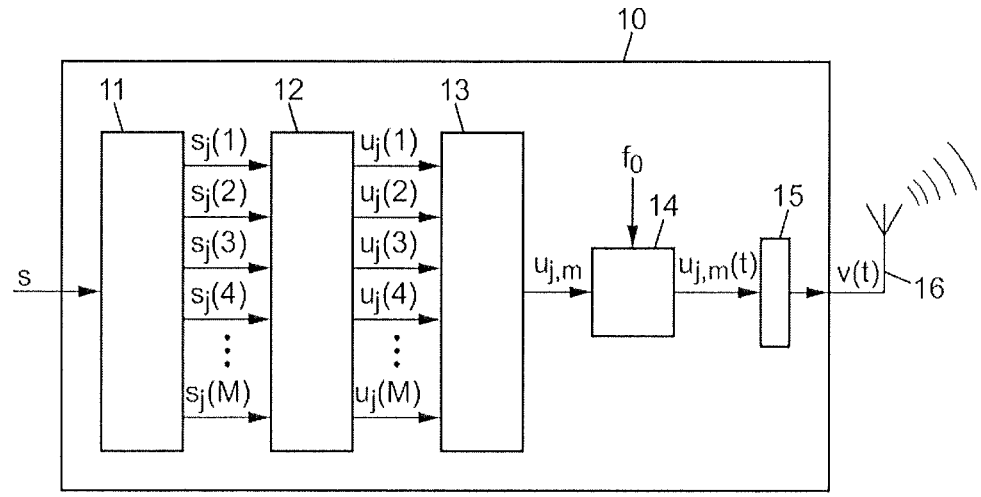
FIG. 1 is a diagram illustrating a transmission method and device of the prior art.

FIG. 1 illustrates the general principles of a device 10 for transmitting digital data using OFDM technology.

OFDM is used in particular in digital audio broadcasting (DAB) and digital video broadcasting (DVB), wired networks (DSL), wireless networks (WIFI), and cell phone communication networks (UMTS).

In the transmission device 10, the letter s indicates digital data to be serially transmitted on the communication channel. These digital data s are, for example, binary information.

A demultiplexer 11 performs a serial-parallel conversion, and converts, at a time of index j, this serial stream of digital data s into M parallel streams of symbols $s_j(m)$, denoted $s_j(1)$, $s_j(2)$ to $s_j(M)$. These M parallel streams of symbols $s_j(m)$ have a transmission temporal rate M times slower than the serial stream of digital data s. Each of these parallel streams of symbols $s_j(m)$ is intended to be sent over a sub-carrier of index m of the bandwidth. At a time of index j, a vector $s_j$ of components $s_j(m)$ where m is between 1 and M, is called the OFDM symbol. Its duration is of a period $T_s$, while the duration of a digital data item in the serial stream s is $T_s/M$.

An inverse fast Fourier transform (IFFT) 12 transforms these symbols $s_j(m)$ into transformed symbols $u_j(m)$, denoted $u_j(1)$, $u_j(2)$ to $u_j(M)$. In particular:

$$u_j(m) = \frac{1}{M} \cdot \sum_{p=1}^{M} s_j(p) \cdot e^{\left(+\frac{2i\pi}{M}\right)(m-1)\cdot(p-1)} \tag{1}$$

where i is the complex number defined by $i=\sqrt{-1}$, j is an index corresponding to a time interval during which a OFDM symbol is transmitted, and m is an index corresponding to a sub-carrier.

A multiplexer 13 performs a parallel-serial transform, and transforms the M parallel streams of transformed symbols $u_j(m)$ into a single serial stream $u_j$, of the same transformed symbols.

A modulator 14, such as a quadrature modulator, modulates the signal carrier at a frequency $f_0$ to generate a modulated signal $u_{j,m}(t)$, continuous over time, from the serial stream $u_j$ of transformed symbols. In the case of complex digital data and the use of quadrature modulation, one obtains:

$$u_{j,m}(t) = \Re(u_j(m) \cdot e^{2i\pi f_0 t})$$

$$u_{j,m}(t) = \Re(u_j(m)) \cdot \cos(2\pi f_0 t) - \tau(u_j(m)) \cdot \sin(2\pi f_0 t) \tag{2}$$

where $\Re()$ and $\tau()$ are the real and imaginary parts, respectively, cos() and sin() are the cosine and sine functions, respectively, and t is the time.

Next a transmission filter 15 transforms this modulated signal $u_{j,m}(t)$ into a filtered signal $v_{j,m}(t)$, which leads to:

$$v_{j,m}(t) = u_{j,m}(t) \cdot h\left(t - (j-1) \cdot T_s - (m-1) \cdot \frac{T_s}{M}\right) \tag{3}$$

where h(t) is the impulse response of the transmission filter 15, and $T_s$ is the time interval of an OFDM symbol, meaning the OFDM symbol rate.

The transmission filter can be a simple rectangular wave form of duration $T_s/M$ or advantageously it can be such a waveform convoluted by a frequency lowpass filter or a passband filter, adapted to apply an amplification and limit the frequency bandwidth of the transmission signal.

A transmission signal v(t) corresponds to the filtered signal $v_{j,m}(t)$ for all OFDM symbol indexes j and for all sub-carrier indexes m, meaning:

$$v(t) = \sum_{j=1}^{\infty} \sum_{m=1}^{M} v_{j,m}(t) \tag{4}$$

The steps between the calculation of the inverse fast Fourier transforms of an OFDM symbol and the formation of the transmission signal v(t) can be referred to as multi-carrier modulation. The calculation of the inverse fast Fourier transform of the OFDM symbol avoids the use of M modulators at the frequencies of the sub-carriers m, which would require extremely good synchronization. The multi-carrier modulation is therefore done with an inverse fast Fourier transform and only one modulator using a signal carrier at frequency $f_0$.

This transmission signal v(t) is then adapted to be transmitted by a transmission antenna 16 on the communication channel.

Such processing allows performing the digital equivalent of a multi-carrier modulation, as each symbol $s_j(m)$ is modulated over a sub-carrier of index m of the carrier of frequency $f_0$.

Figure 2:
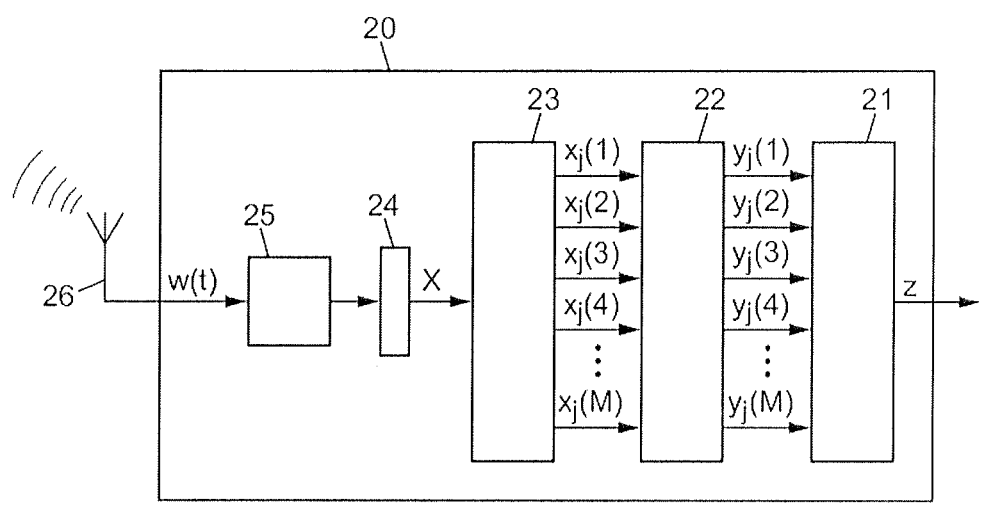
FIG. 2 is a diagram illustrating a receiving method and device of the prior art.

FIG. 2 illustrates the general principles of a digital data receiving device 20 using this same OFDM technology.

In the receiving device 20, a receiving antenna 26 receives a signal transmitted on the communication channel and provides a continuous signal w(t).

A receiving filter 25 and a demodulator 24 deliver a serial stream x of digital data.

This serial stream x of digital data then undergoes a serial-parallel transformation by the demultiplexer 23, to provide M parallel streams of symbols $x_j(m)$, denoted $x_j(1)$, $x_j(2)$ to $x_j(M)$. For time interval j, a vector $x_j$ of components $x_j(m)$, where m is between 1 and M, is called the received OFDM symbol.

A fast Fourier transform 22 provides M streams of symbols $y_j(m)$, denoted $y_j(1)$, $y_j(2)$ to $y_j(M)$:

$$y_j(m) = \sum_{p=1}^{M} x_j(p) \cdot e^{\left(-\frac{2i\pi}{M}\right)(m-1)(p-1)}$$

A parallel-serial transformation by the multiplexer 21 then provides the received digital data y. This diagram for the receiving device 20 is therefore a diagram symmetrical to the diagram for the transmitting device 10.

The receiving digital data y are equal to the transmission digital data s, multiplied by a complex coefficient corresponding to the complex value of the transfer function of the communication channel at the frequency considered. Many known techniques for channel estimation are usable for determining these complex values.

The transmission device 10 can be supplemented upstream by a binary coding step and/or an error correction coding step. Many known methods for binary encoding exist: m-state phase modulation coding, denoted PMm, or quadrature amplitude modulation encoding, denoted QAMm. Many known methods exist for error correction coding, in which redundant data are added to the data to be transmitted in order to detect and/or correct transmission errors in the communication channel.

Reciprocally, the receiving device 20 can be supplemented downstream by a binary decoding step and/or an error correction decoding step.

Also, such a transmission method using OFDM technology can be more generally applied by using it with a MIMO (Multi Input Multi Output) device comprising several transmission antennas and several receiving antennas. In such systems, the intention is generally to increase the communication throughput between the transmitter base and a receiver having several receiving antennas.

Using this OFDM technology, signals are sent in parallel in the communication channel on different sub-carriers. This reduces noise related to echoes on the communication channel, and there is little intersymbol interference (ISI) between consecutive symbols.

Figure 3:
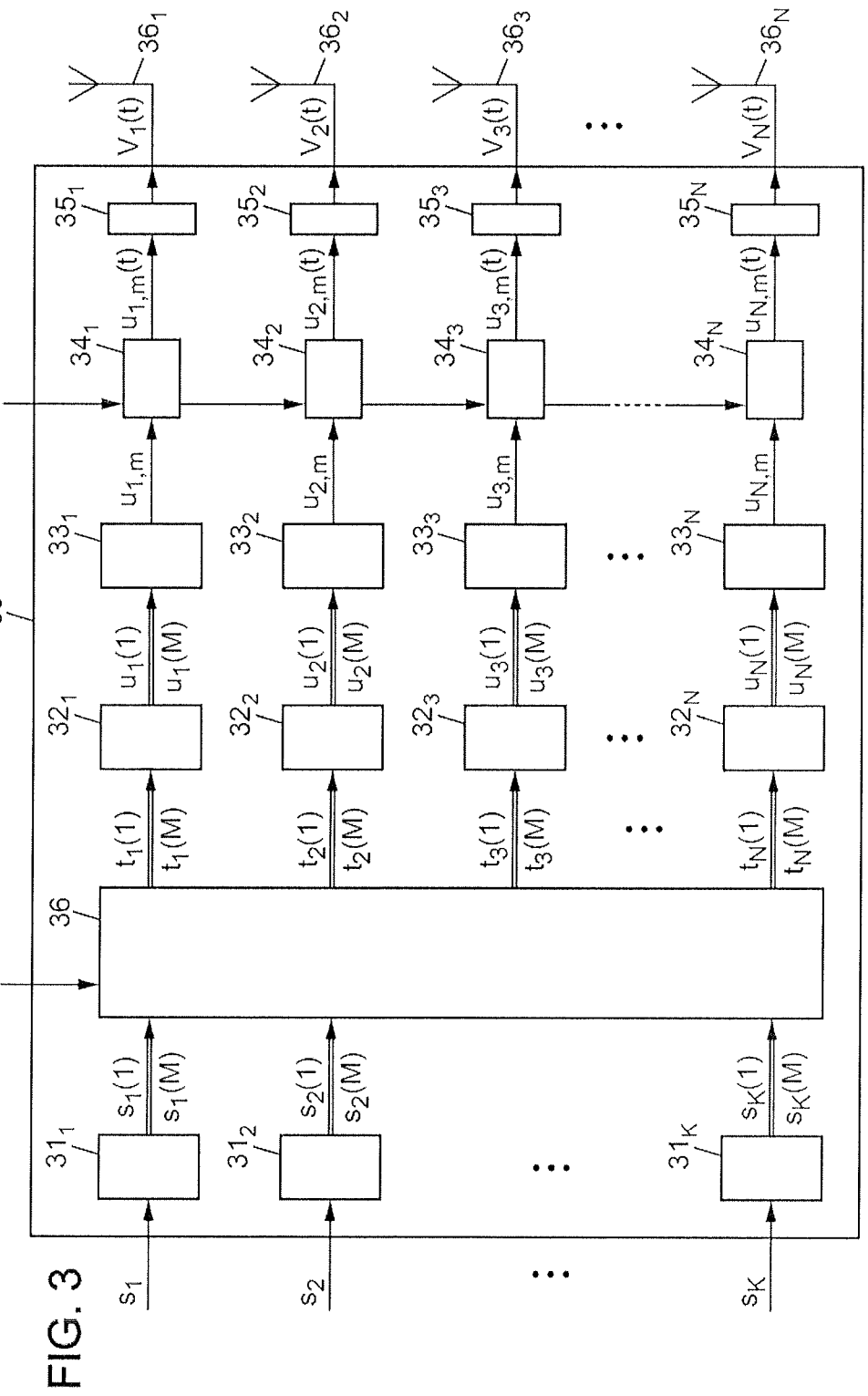
FIG. 3 is a diagram illustrating a transmission method and device of the invention.

FIG. 3 illustrates an embodiment of a transmitter base 30 according to the invention, using elements similar to the diagram in FIG. 1.

The transmitter base 30 comprises a plurality of digital data inputs of index k, where k is between 1 and K, each forming an independent stream of digital data $s_k$ intended for a particular receiver of the same index. We therefore have a single transmitter base 30 adapted to send distinct digital data to K receivers. These K receivers are located at different positions in space. The communication channel between the transmitter base 30 and the receivers then has different transfer functions between said transmitter base and each receiver of index k.

Each digital data stream $s_k$ supplies data to a demultiplexer $31_1$, $31_2$, to $31_K$, which converts each stream of symbols $s_k$ into M parallel streams of digital data $s_k(m)$. For example, for the first stream of digital data $s_1$, the demultiplexer $31_1$ generates the parallel streams $s_1(m)$ of symbols, denoted $s_1(1)$ to $s_1(M)$.

In FIG. 3, the double arrows represent M parallel streams to simplify the diagram in comparison to the representation used in FIGS. 1 and 2.

In addition, these transformation steps are performed at a time interval j as it was in the method described above, but the j indexes are omitted for clarity in the equations.

A calculation unit 36 then converts the K.M parallel streams of symbols $s_k(m)$ into N.M parallel streams of complex symbols $t_n(m)$, where n is an index between 1 and N, using the following calculation:

$$t_n(m) = \sum_{k=1}^{K} \alpha_k \cdot H^*_{k,n}(m) \cdot s_k(m) \quad (5)$$

where

* denotes a complex conjugate,

N represents the number of transmission antennas of the transmitter base 30, $H_{k,n}(m)$ is a complex value estimating the communication channel transfer between the transmission antenna of index n and the receiving antenna of index k at a frequency corresponding to a sub-carrier of index m, and $\alpha_k$ is a normalization coefficient.

We will discuss further below the calculation of this normalization coefficient $\alpha_k$.

One will see that it is advantageous to have N>K in this calculation, meaning a number of transmission antennas which is greater than the number of receiving antennas.

The calculation unit 36 performs a particular type of pre-equalization of the digital data. We will provide explanations further below of the effects of this calculation in the transmitter base 30.

The complex symbols $t_n(m)$ can be organized into N vectors $t_n$, each of them corresponding to a OFDM symbol as described above. This OFDM symbol is then also processed in the same manner.

N inverse fast Fourier transforms $32_1$ to $32_N$ transform the N.M parallel streams of complex symbols $t_n(m)$ into N.M parallel streams of transformed complex symbols $u_n(m)$ by using N equations of the type in (1), which can be rewritten as follows:

$$u_n(m) = \frac{1}{M} \cdot \sum_{p=1}^{M} t_n(p) \cdot e^{\left(+\frac{2i\pi}{M}\right)\cdot(m-1)\cdot(p-1)} \quad (6)$$

N multiplexers $33_1$ to $33_N$ then transform these N.M parallel streams of transformed complex symbols $u_n(m)$ into N serial streams of transformed complex symbols $u_{n,m}$, which are then synchronously modulated to the frequency $f_0$ of a carrier by modulators $34_1$ to $34_N$ in order to generate the modulated signals $u_{n,m}(t)$. For example, for a quadrature modulation, we can write:

$$u_{n,m}(t) = \Re(u_n(m) \cdot e^{2i\pi f_0 t}) \quad (7)$$

These modulated signals $u_{n,m}(t)$ are then filtered by filters $35_1$ to $35_N$ to generate the filtered signals $v_{n,m}(t)$:

$$v_{n,m}(t) = u_{n,m}(t) \cdot h\left(t - (j-1)\cdot T_s - (m-1)\cdot \frac{T_s}{M}\right) \quad (8)$$

The N transmission signals $v_n(t)$ for each transmission antenna $36_1$ to $36_N$ can then be calculated by a double sum over the j indexes (OFDM symbols) and the m indexes (sub-carriers):

$$v_n(t) = \sum_{j=1}^{\infty} \sum_{m=1}^{M} v_{n,m}(t) \quad (9)$$

or in other words:

$$v_n(t) = \sum_{j=1}^{\infty} \sum_{m=1}^{M} u_{n,m}(t) \cdot h\left(t - (j-1)\cdot T_s - (m-1)\cdot \frac{T_s}{M}\right) \quad (10)$$

Each transmission signal $v_n(t)$ then supplies data to one of the N transmission antennas $36_1$ to $36_N$.

The transmitter base 30 therefore performs a first conversion step in a calculation unit 36, then carries out in parallel N multi-carrier modulations all synchronized on the signal carrier of frequency $f_0$, to produce the transmission signals $v_n(t)$.

Each receiver used with the communication base 30 is substantially identical to the receiving device 20 described in FIG. 2.

It receives on its receiving antenna 26 a signal which it transforms to produce a stream of receiver digital data $z_k$ at antenna k, of the type:

$$z_k = c \cdot \sum_{n=1}^{N} t_n(m) \cdot H_{k,n}(m) \qquad (11)$$

where c is a complex constant representing the presumably linear transformations of inverse fast Fourier transforms, modulation, demodulation, and Fourier transforms.

By replacing $t_n(m)$ with the expression from formula (1) and inverting the sums we obtain:

$$z_k = c \cdot \sum_{n=1}^{N} \left( \sum_{k=1}^{K} H_{k,n}^*(m) \cdot s_k(m) \right) \cdot H_{k,n}(m)$$

$$z_k = c \cdot \sum_{k=1}^{K} \left( \sum_{n=1}^{N} H_{k,n}^*(m) \cdot H_{k,n}(m) \right) \cdot s_k(m)$$

For example, in the case of the first receiver (k=1), the above formula is expanded as follows:

$$z_1 = c \cdot \left[ \sum_{n=1}^{N} |H_{1,n}|^2 \cdot s_1 + \sum_{n=1}^{N} H_{2,n}^* \cdot H_{1,n} \cdot s_2 + \ldots \sum_{n=1}^{N} H_{K,n}^* \cdot H_{1,n} \cdot s_K \right]$$

In this sum the first term is non-zero, and the following terms are small, and grow smaller as N grows larger. Thus we can write:

$$z_1 \approx c \cdot \sum_{n=1}^{N} |H_{1,n}|^2 \cdot s_1$$

In general, we obtain:

$$z_k \approx c \cdot \sum_{n=1}^{N} |H_{1,n}|^2 \cdot s_k \qquad (12)$$

This formula (12) means that each stream of digital data $s_k$ intended for antenna k is focused on the antenna k in order to provide a stream of receiver data $z_k$ which does not have interference from the other digital data streams.

The normalization coefficient $\alpha_k$ of formula (5) can be a predetermined constant.

In a first variant, the normalization coefficient $\alpha_k$ is calculated such that a mean power $\Pi$ transmitted by the transmitter base 30 over the sub-carriers of index m is independent of the receivers k and has a value $\alpha$.

The mean power $\Pi$ is equal to:

$$\Pi = \langle t_n(m) \cdot t_n^*(m) \rangle$$

Formula (5) can be written as follows:

$$t_n(m) = \alpha \cdot \sum_{k=1}^{K} H_{k,n}^*(m) \cdot s_k(m).$$

We have:

$$\Pi = \sum_n \langle t_n(m) t_n^*(m) \rangle = |\alpha|^2 \sum_n \sum_k \sum_{k'} H_{k,n}^*(m) H_{k',n}(m) \langle s_k(m) s_{k'}^*(m) \rangle et$$

$$\Pi = |\alpha|^2 \langle |s|^2 \rangle \sum_n \sum_k |H_{k,n}(m)|^2$$

because: $\langle s_k(m) s_{k'}^*(m) \rangle = \langle s(m)^2 \rangle \delta_{k,k'}$ where $\langle\ \rangle$ represents the mean for the symbols, $\langle |s(m)|^2 \rangle$ is the variance of the symbols, and $\langle s(m) \rangle = 0$.

The value $\alpha$ of the normalization coefficient is then calculated by:

$$|\alpha|^2 = \frac{\Pi}{\langle |s(m)|^2 \rangle \sum_n \sum_k |H_{k,n}(m)|^2}$$

where $\Pi$ is a predetermined mean transmitted power, $\langle\ \rangle$ represents a mean for the symbols, $\langle |s(m)|^2 \rangle$ is the variance of the symbols.

In a second variant, the normalization coefficient $\alpha_k$ is calculated to obtain a received signal amplitude that is identical on each receiving antenna k.

The symbols received on each receiver k are then:

$$z_{k'}(m) = \sum_n \alpha_{k'} |H_{k',n}(m)|^2 s_{k'}(m),$$

and

Its energy is:

$$\langle |z_{k'}(m)|^2 \rangle = |\alpha_{k'}|^2 \langle |s(m)|^2 \rangle \left( \sum_n |H_{k',n}(m)|^2 \right)^2 = \beta^2.$$

It is desirable if all amplitudes are the same for all receiving antennas.

The transmitted power $\Pi$ can then be calculated by:

$$\Pi = \sum_n \langle t_n(m) t_n^*(m) \rangle = \sum_k \beta^2 \frac{\sum_n |H_{k,n}(m)|^2}{\left( \sum_n |H_{k,n}(m)|^2 \right)^2} = \beta^2 \sum_k \frac{1}{\left( \sum_n |H_{k,n}(m)|^2 \right)}$$

The normalization coefficient $\alpha_k$ of formula (5) can then be calculated by:

$$|\alpha_k|^2 = \frac{\Pi}{\langle |s(m)|^2\rangle \left(\sum_n |H_{k,n}(m)|^2\right)^2} \sum_k \left(\sum_n |H_{k,n}(m)|^2\right)^{-1}$$

where
Π is a predetermined mean transmitted power,
< > represents a mean for the symbols,
$\langle |s(m)|^2\rangle$ is the variance of the symbols.

In a third variant, the normalization coefficient $\alpha_k$ is calculated by generalizing the above calculation, in order to obtain a predetermined power value for each receiving antenna.

The symbols received at each receiver k are then:

$$z_{k'}(m) = \sum_n \alpha_{k'} |H_{k',n}(m)|^2 s_{k'}(m),$$

and
Its energy is:

$$\langle |z_{k'}(m)|^2\rangle = |\alpha_{k'}|^2 \langle |s(m)|^2\rangle \left(\sum_n |H_{k',n}(m)|^2\right)^2 = \gamma^2 \beta_{k'}^2.$$

The transmitted power Π can then be calculated by:

$$\Pi = \sum_n \langle t_n(m) t_n^*(m)\rangle = \gamma^2 \sum_k \beta_k^2 \frac{\sum_n |H_{k,n}(m)|^2}{\left(\sum_n |H_{k,n}(m)|^2\right)^2} = \gamma^2 \sum_k \frac{\beta_k^2}{\left(\sum_n |H_{k,n}(m)|^2\right)}$$

The normalization coefficient $\alpha_k$ of the formula (5) can then be calculated by:

$$|\alpha_k|^2 = \frac{\Pi}{\langle |s(m)|^2\rangle \left(\sum_n |H_{k,n}(m)|^2\right)^2} \sum_{k'} \frac{\beta_{k'}^2}{\left(\sum_n |H_{k',n}(m)|^2\right)} \beta_k^2$$

where
Π is a predetermined mean transmitted power,
$\beta_k$ is a predetermined mean power received by the receiving antenna k,
< > represents a mean for the symbols,
$\langle \|s(m)\|^2\rangle$ is the variance of the symbols.

In the following variants, only the phase of the transfer of the communication channel $H_{k,n}(m)$ is used (as the modulus is considered to be equal to 1) when calculating the N.M complex symbols $t_n(m)$. We therefore have:

$$t_n(m) = \sum_k \alpha_k \exp(i\arg(H_{k,n}^*(m))) s_k(m)$$

In a fourth variant, similar to the first variant, but in which only the phase of the transfer of the communication channel $H_{k,n}(m)$ is used, the value α of the normalization coefficient is then calculated by:

$$|\alpha_k|^2 = |\alpha|^2 = \frac{\Pi}{\langle |s(m)|^2\rangle NK}$$

where
Π is a predetermined mean transmitted power,
< > represents a mean for the symbols,
$\langle |s(m)|^2\rangle$ is the variance of the symbols.

In a fifth variant, similar to the second variant, but in which only the phase of the transfer of the communication channel $H_{k,n}(m)$ is used, the symbols received on each receiver k are received while disregarding inter-user interference, meaning the interference between each receiving antenna k:

$$z_{k'}(m) = \sum_n \alpha_{k'} |H_{k',n}(m)| s_{k'}(m),$$

and
Its energy is:

$$\langle |z_{k'}(m)|^2\rangle = |\alpha_{k'}|^2 \langle |s(m)|^2\rangle \left(\sum_n |H_{k',n}(m)|\right)^2 = \beta^2.$$

It is desirable if all amplitudes are the same for all receiving antennas.

The transmitted power Π can then be calculated by:

$$\prod = \sum_n \langle t_n(m) t_n^*(m)\rangle = \sum_k \beta^2 \frac{N}{\left(\sum_n |H_{k,n}(m)|\right)^2}$$

The normalization coefficient $\alpha_k$ of formula (5) can then be calculated by:

$$|\alpha_k|^2 = \frac{\Pi}{\langle |s|^2\rangle \left(\sum_n |H_{k,n}(m)|\right)^2 N \sum_{k'} \left(\sum_n |H_{k',n}(m)|\right)^{-2}}$$

where
Π is a predetermined mean transmitted power,
< > represents a mean for the symbols,
$\langle |s(m)|^2\rangle$ is the variance of the symbols.

In a sixth variant, similar to the third variant but in which only the phase of the transfer of the communication channel $H_{k,n}(m)$ is used, the symbols received on each receiver k are then:

$$z_{k'}(m) = \sum_n \alpha_{k'} |H_{k',n}(m)| s_{k'}(m),$$

and
Its energy is:

$$\langle |z_{k'}(m)|^2 \rangle = |\alpha_{k'}|^2 \langle |s(m)|^2 \rangle \left( \sum_n |H_{k',n}(m)| \right)^2 = \gamma^2 \beta_{k'}^2.$$

The transmitted power Π can then be calculated by:

$$\prod = \sum_n \langle t_n(m) t_n^*(m) \rangle = \gamma^2 \sum_k \beta^2 \frac{N}{\left( \sum_n |H_{k,n}(m)| \right)^2}$$

The normalization coefficient $\alpha_k$ of formula (5) can then be calculated by:

$$|\alpha_k|^2 = \frac{\prod \beta_k^2}{\langle |s|^2 \rangle \left( \sum_n |H_{k,n}(m)| \right)^2 N \sum_{k'} \frac{\beta_{k'}^2}{\left( \sum_n |H_{k',n}(m)| \right)^2}}$$

where

Π is a predetermined mean transmitted power, $\beta_k$ is a predetermined mean power received by the receiving antenna k, < > represents a mean for the symbols, $\langle |s(m)|^2 \rangle$ is the variance of the symbols.

Lastly, a receiver base of the invention can then be realized using the same principles. It will comprise a calculation unit preceding OFDM demodulators which each comprise a fast Fourier transform.

The invention claimed is:

1. A method for transmitting digital data over a communication channel, between:
   a transmitter base comprising transmission antennas of index n, where n is between 1 and N and N is an integer greater than 1, and
   receivers of index k, where k is between 1 and K and K is an integer greater than 1, each receiver comprising at least one receiving antenna, wherein a signal carrier of frequency $f_0$ is used to transport the digital data on the communication channel, and sub-carriers are used of index m, where m is between 1 and M, and M is an integer greater than 1, adapted to transport K streams of digital data $s_k$ in parallel from the transmitter base, each stream of digital data $s_k$ being intended for each receiver of index k, wherein said method comprises the following steps:
   (a1) each of the K streams of digital data $s_k$ are transformed into M parallel streams $s_k(m)$ of symbols, each of the parallel streams being intended for a sub-carrier of index m,
   (b1) N.M complex symbols $t_n(m)$ are calculated from the K.M symbols $s_k(m)$, by:

$$t_n(m) = \sum_{k=1}^{K} \alpha_k \cdot H_{k,n}^*(m) \cdot s_k(m)$$

where
* denotes a complex conjugate,
$H_{k,n}(m)$ is a complex value estimating the transfer function of the communication channel between the transmission antenna n and the at least one receiving antenna k at a corresponding frequency of the sub-carrier m, and
$a_k$ is a normalization coefficient, adapted to avoid obtaining complex symbols $t_n(m)$ of too large a value which would cause saturation,
(c1) N multi-carrier modulations of the complex symbols $t_n(m)$ are performed, where said m is between 1 and M, to produce N transmission signals $v_n(t)$, each transmission signal $v_n(t)$ being intended for the transmission antenna n, and all the multi-carrier modulations being synchronous with each other, and
(d1) each transmission signal $v_n(t)$ in the communication channel is transmitted by the transmitter base.

2. The method according to claim 1, wherein the multi-carrier modulation of the complex symbols $t_n(m)$, where said m is between 1 and M, is done by the following steps:
(a2) an inverse fast Fourier transform (IFFT) of the complex symbols $t_n(m)$ is calculated to produce transformed complex symbols $u_n(m)$, by:
$u_n(m)$=IFFT($t_n(m)$), where said m is between 1 and M,
(b2) temporal serialization of these transformed complex symbols un(m) into a serial stream of symbols is performed, (c2) a synchronous modulation of this serial stream is performed with the signal carrier of frequency $f_0$ to produce modulated signals $u_{n,m}(t)$ from each transmission antenna n by:

$$u_{n,m}(t) = \Re(u_n(m), e^{2i\pi f_0 t})$$

where
R( ) is the real part,
i is the complex number defined by i=√1̄, and
t is the time,
(d2) each modulated signal $u_{n,m}(t)$ is filtered and a said transmission signal $v_n(t)$ is produced for each said intended transmission antenna, by:

$$v_n(t) = \sum_{j=1}^{\infty} \sum_{m=1}^{M} u_{n,m}(t) \cdot h\left( t - (j-1) \cdot T_s - (m-1) \cdot \frac{T_s}{M} \right)$$

where
h(t) is the impulse response of a transmission filter.

3. The method according to claim 2, wherein the inverse fast Fourier transform (IFFT) of the complex symbols $t_n(m)$ to produce transformed complex symbols $u_n(m)$ is calculated by:

$$u_n(m) = \frac{1}{M} \cdot \sum_{p=1}^{M} t_n(p) \cdot e^{\left(+\frac{2i\pi}{M}\right) \cdot (m-1)(p-1)}.$$

4. The method according to claim 1, wherein the normalization coefficient $a_k$ is a predetermined constant.

5. The method according to claim 1, wherein the normalization coefficient $a_k$ is calculated from the values of the symbols $s_k(m)$ and the value of the transfer function of the communication channel $H_{k,n}(m)$.

6. The method according to claim 5, wherein the normalization coefficient $a_k$ is calculated by:

$$|\alpha|^2 = \frac{\prod}{\langle |s(m)|^2\rangle \sum_n \sum_k |H_{k,n}(m)|^2} = \alpha_k$$

where
P is a predetermined mean transmitted power,
< > represents a mean for the symbols,
$\langle |s(m)|^2\rangle$ is the variance of the symbols.

7. The method according to claim 5, wherein the normalization coefficient $a_k$ is calculated by:

$$|\alpha_k|^2 = \frac{\prod}{\langle |s(m)|^2\rangle \left(\sum_n |H_{k,n}(m)|^2\right)^2 \sum_k \left(\sum_n |H_{k,n}(m)|^2\right)^{-1}}$$

where
P is a predetermined mean transmitted power,
< > represents a mean for the symbols,
$\langle |s(m)|^2\rangle$ is the variance of the symbols.

8. The method according to claim 5, wherein the normalization coefficient $a_k$ is calculated by:

$$|\alpha_k|^2 = \frac{\prod}{\langle |s(m)|^2\rangle \left(\sum_n |H_{k,n}(m)|^2\right)^2 \sum_{k'} \frac{\beta_{k'}^2}{\left(\sum_n |H_{k',n}(m)|^2\right)}} \beta_k^2$$

where
P is a predetermined mean transmitted power,
$B_k$ is a predetermined mean power received by the receiving antenna k,
< > represents a mean for the symbols,
$\langle |s(m)|^2\rangle$ is the variance of the symbols.

9. The method according to claim 1, wherein each complex value $H_{k,n}(m)$ is a value estimating only the phase of the transfer function of the communication channel between the transmission antenna n and the at least one receiving antenna k at the corresponding frequency of the sub-carrier m.

10. The method according to claim 9, wherein the normalization coefficient a, is calculated by:

$$|\alpha_k|^2 = |\alpha|^2 = \frac{\prod}{\langle |s(m)|^2\rangle NK}$$

where
P is a predetermined mean transmitted power,
< > represents a mean for the symbols,
$\langle |s(m)|^2\rangle$ is the variance of the symbols.

11. The method according to claim 9, wherein the normalization coefficient $a_k$ is calculated by:

$$|\alpha_k|^2 = \frac{1}{\langle |s|^2\rangle} \frac{\prod}{\left(\sum_n |H_{k,n}(m)|\right)^2 N \sum_{k'} \left(\sum_n |H_{k',n}(m)|\right)^{-2}}$$

where
P is a predetermined mean transmitted power,
$B_k$ is a predetermined mean power received by the receiving antenna k,
< > represents a mean for the symbols,
$\langle |s(m)|^2\rangle$ is the variance of the symbols.

12. The method according to claim 9, wherein the normalization coefficient a is calculated by:

$$|\alpha_k|^2 = \frac{1}{\langle |s|^2\rangle} \frac{\prod \beta_k^2}{\left(\sum_n |H_{k,n}(m)|\right)^2 N \sum_{k'} \frac{\beta_{k'}^2}{\left(\sum_n |H_{k',n}(m)|\right)^2}}$$

where
P is a predetermined mean transmitted power,
$B_k$ is a predetermined mean power received by the receiving antenna k,
< > represents a mean for the symbols,
$\langle |s(m)|^2\rangle$ is the variance of the symbols.

13. A transmitter base comprising:
a calculation means, adapted to implement the method according to claim 1 and to generate the N transmission signals $v_n(t)$ of said index n, where n is between 1 and N and N is an integer greater than 1, from said K streams of the digital data $s_k$ of said index k, where said k is between 1 and K and said K is an integer greater than 1, and
the transmission antennas adapted to transmit each transmission signal $v_n(t)$ on the communication channel.

\* \* \* \* \*